United States Patent [19]

Nemazi et al.

[11] Patent Number: 5,050,279
[45] Date of Patent: Sep. 24, 1991

[54] SNAP FASTENER

[75] Inventors: John E. Nemazi, Troy; Ralph M. Burton, Marine City; Tirupathi R. Chandrupatla, Flint, all of Mich.

[73] Assignee: Snap Fast Industries, Harper Woods, Mich.

[21] Appl. No.: 382,666

[22] PCT Filed: Sep. 18, 1987

[86] PCT No.: PCT/US87/02414
§ 371 Date: Jun. 28, 1989
§ 102(e) Date: Jun. 28, 1989

[87] PCT Pub. No.: WO89/02230
PCT Pub. Date: Mar. 23, 1989

[51] Int. Cl.$^5$ .............................................. A44B 17/00
[52] U.S. Cl. ...................................... 24/662; 24/453; 24/687; 24/691
[58] Field of Search ................... 24/90 E, 104, 116 R, 24/106–108, 265 C, 453, 573, 618–624, 662, 687–692; 297/218

[56] References Cited

U.S. PATENT DOCUMENTS

| 153,792 | 8/1874 | Stickle | 24/662 |
| 454,549 | 6/1891 | Upham | 24/618 |
| 1,069,433 | 8/1913 | Kane | 24/620 X |
| 1,096,897 | 5/1914 | Fisher | 24/662 X |
| 1,281,834 | 10/1918 | Rainftlen | 24/116 R |
| 1,748,047 | 2/1930 | Carr | 24/623 |
| 2,452,173 | 10/1948 | Zwiebel | 24/90 E |
| 3,438,099 | 4/1969 | Green | 24/265 C X |
| 3,769,661 | 11/1973 | Bengtsson | 24/573 |
| 3,831,225 | 8/1974 | Bengtsson | 24/453 |
| 4,017,945 | 4/1977 | Stanik et al. | 24/624 |
| 4,409,706 | 10/1983 | Clendinen | 24/662 X |
| 4,539,735 | 9/1985 | Kasai | 24/621 |
| 4,562,624 | 1/1986 | Kanzaka | 24/621 |
| 4,577,376 | 3/1986 | Clendinen | 24/662 X |
| 4,646,399 | 3/1987 | Clendinen | 24/662 X |
| 4,692,969 | 9/1987 | Johnson | 24/573 |

Primary Examiner—James R. Brittain
Attorney, Agent, or Firm—Brooks & Kushman

[57] ABSTRACT

A snap fastener stud (S) for accommodating receivers (R) of varying thickness has a generally pear-shaped head with latching and retaining seats (38 and 40) therebeneath on opposite sides of the stud with the retaining seat having a radius of curvature (t) substantially greater than the radius of curvature (r) of the confronting surface of the receiver (R). In a modification the stud is capable of receiving a plurality of receivers ($R_1$ and $R_3$). The receivers may be formed with an annulus (72) which is separate from the portions (86 and 88) which are crimped to the fabric (F). The stud (S) has ribs (116) for preventing rotation on a surface on which the stud is mounted and a saddle shaped adapter (110) enables mounting of the stud on a cylindrical support (TF).

14 Claims, 5 Drawing Sheets

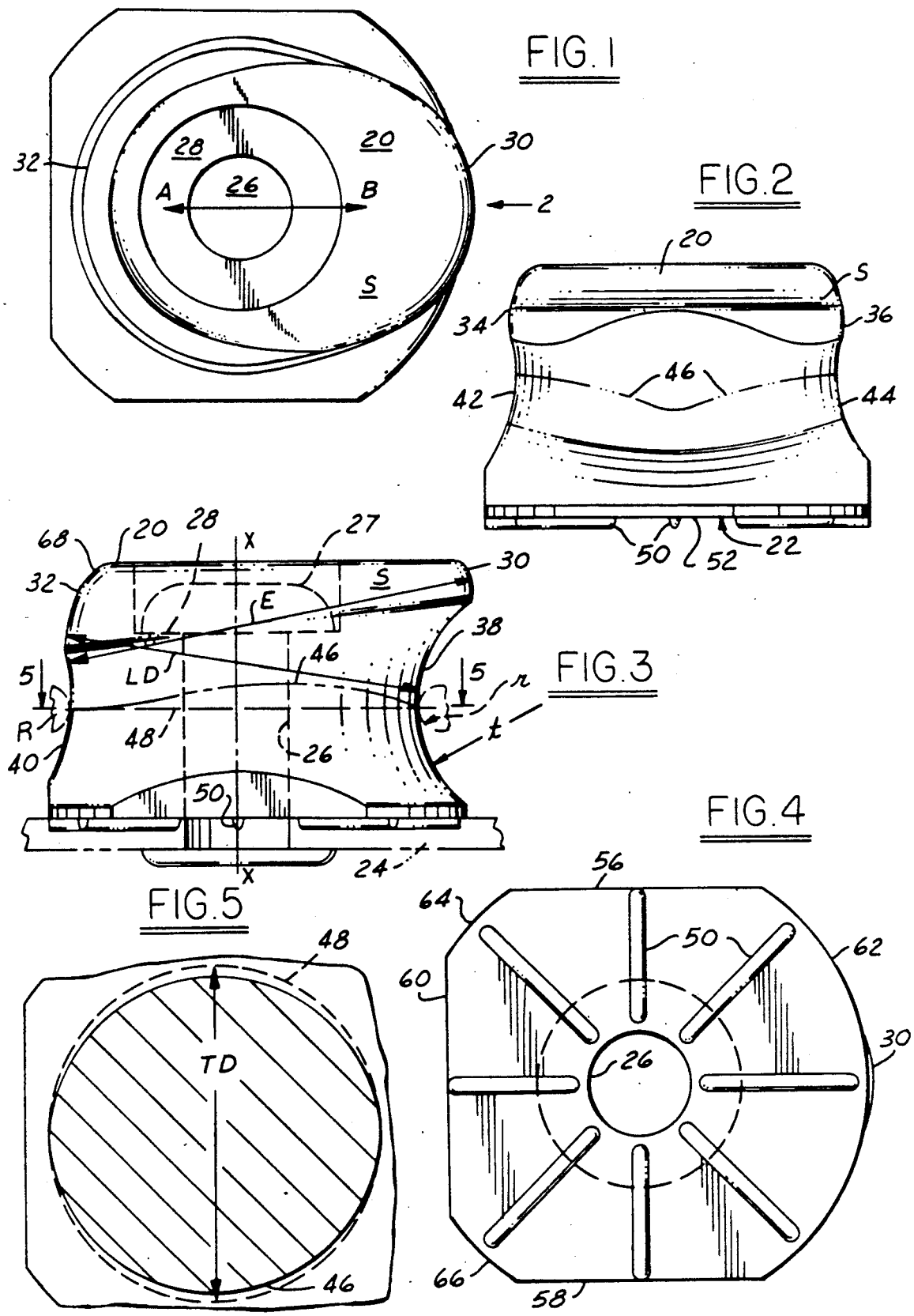

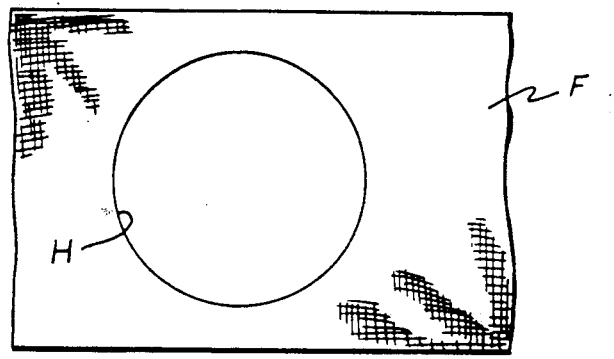
FIG.13
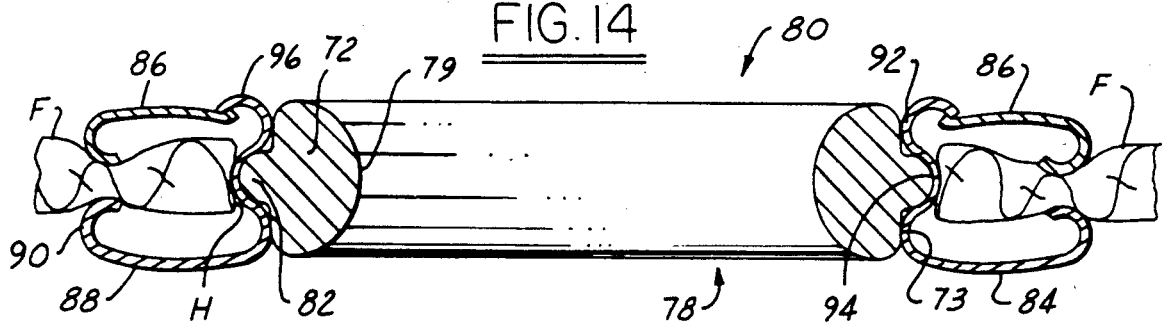
FIG.14
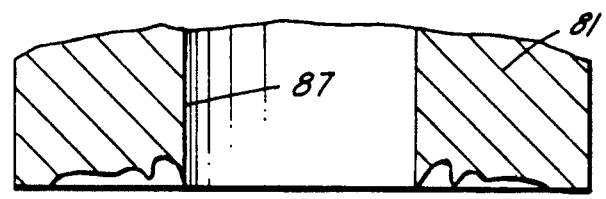
FIG.15
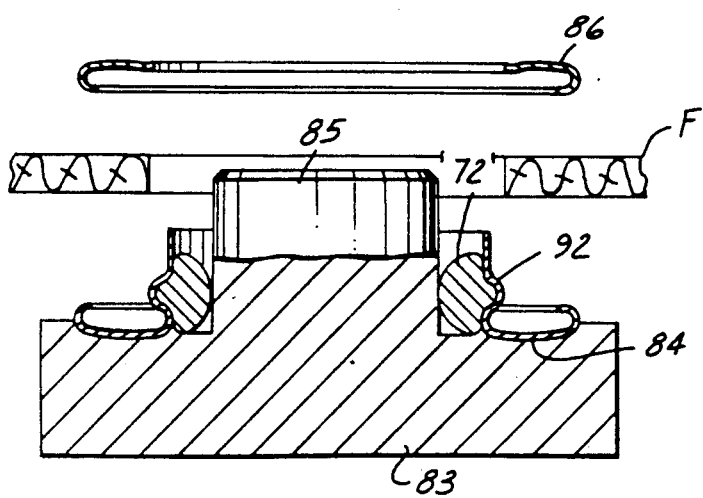

SNAP FASTENER

RELATED U.S. APPLICATION DATA

This application incorporates by reference U.S. Pat. Nos. 4,577,376, 4,646,399, and 4,409,706.

1. Field of Invention

This invention relates to snap fasteners intended to connect together two or more members with which the fastener is associated.

2. Background of Invention

U.S. Pat. Nos. 4,577,376, 4,646,399 and 4,409,706 disclose snap fasteners which represent substantial improvements over the conventional DOT ® fastener, or any other commercially available snap fasteners. These improved fasteners essentially comprise a stud connected to one part and a grommet-like receiver connected to the other part, for example a fabric layer. The design of the stud is such that the receiver and stud may be snapped together and cannot be seperated unless a particular edge of the receiver is lifted relative to the stud. Experimentation has shown that several improvements in refining the design are desirable to make a more universally acceptable product.

SUMMARY OF THE INVENTION

The snap fastener herein disclosed has a stud so designed that it will accept the receiver with either side "facing down" and wherein the receiver may be of various thicknesses (as when mounted on various numbers of fabric layers) and yet will lock the parts together with an audible and tactile snapping action. This is accomplished in one embodiment by a redesign of the receiver seats beneath the locking shoulder and retaining lobe. Both seats are substantially "opened up" as compared with the seats in U.S. Pat. No. 4,646,399 and the receiver seat beneath the locking shoulder is generally concave with a radius of curvature substantially greater than the radius of curvature of the confronting surface of a receiver whereby the stud will accommodate receivers of varying thickness or profile.

In another embodiment the stud has receiver seats capable of having multiple receivers mounted thereon. This has particular utility when it is desired to overlap the margins of two covers. For example in bringing together the edges of boat covers it may be desired to place the marginal edges over common studs.

In another improvment in the stud design, the base of the stud is provided with means for resisting rotation of the stud on the member, to which it is secured. Furthermore, the base of the stud may be configured to serve an orienting function not only in mounting the stud on the member to which it is to be permanently secured, but also in automatic handling machines during stud manufacture or application.

As disclosed herein, adapter means are shown permitting mounting of the stud on a cylindrical surface such as an awning frame or a stanchion and yet the stud will not rotate out of position thereon under conventional loading.

In a further improvement, the receiver is designed to have an inside diameter and profile-independent of the attachment of the receiver to the fabric material upon which it is to be mounted, and also wherein the receiver may have a wear surface at its inside diameter different than the characteristics of the material of which the remainder of the receiver is fabricated. In this connection, the strength of the receiver i.e., distortion resistance, may be substantially improved without fabricating the entire receiver of different or stronger materials.

Details of the fastener design giving rise to these desirable advantages are more fully disclosed hereinafter.

BRIEF DESCRIPTION OF DRAWINGS

FIG. 1 is a top or plan view of a snap fastener stud embodying the invention;

FIG. 2 is a front elevation of the stud looking in the direction of arrow 2 in FIG. 1;

FIG. 3 is a side elevation of the stud of FIG. 1;

FIG. 4 is a bottom view of the stud of FIG. 1;

FIG. 5 is a cross-sectional view taken along the line 5—5 of FIG. 3;

FIG. 13 shows a piece of fabric having a hole therein ready for a receiver to be mounted therein;

FIG. 14 is a cross-sectional view through a modified receiver showing a wear annulus whose inside diameter is independent of the attachment of the receiver to the fabric;

FIG. 15 depicts in exploded view a setting tool for assembling the receiver of FIG. 14 to a fabric member;

BRIEF DESCRIPTION OF PREFERRED EMBODIMENTS

Figure 6:
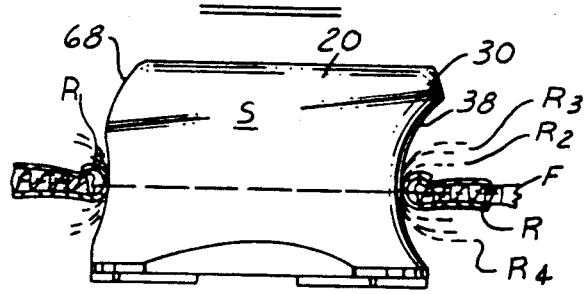
FIG. 6 is a side elevation similar to FIG. 3 and showing a receiver mounted thereon with an exaggerated outline of receivers of varying thickness in relation to the stud.
Figure 7:
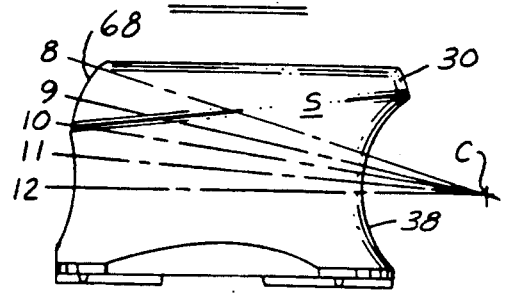
FIG. 7 is a side elevation similar to FIG. 3 but showing five planes extending from the center of curvature of the receiver seat beneath the retaining lobe to various points on the latching shoulder.
Figure 8:
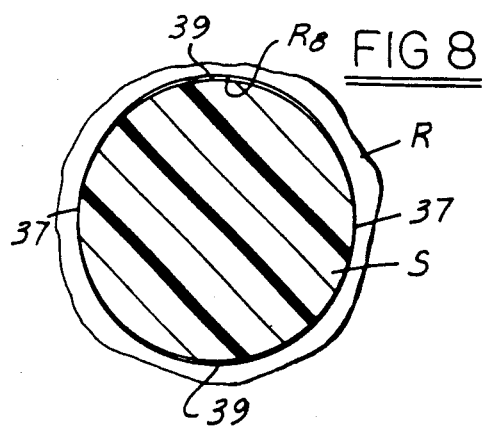
FIGS. 8-12 inclusive are cross-sectional views through the stud taken substantially on planes 8-12 of FIG. 7.

In FIGS. 1-3, 6, 16 and 17, a stud S mounted on a member 24 to be fastened, is intended to cooperate with a receiver R which is mounted on one or more layers of a fabric material F. The stud is preferably made of plastic, such as nylon type 66, with an ultraviolet inhibitor. The stud is generally cylindrical having a head 20 at one end and is intended to be mounted in upstanding relation at its opposite or base end 22 on the member 24. The member 24 may be rigid or may be a flexible fabric as hereinafter mentioned. The stud may have a hole 26 extending axially therethrough with a flat bottom counterbore 28 opening through the head. As shown in plan view in FIG. 1, the head is somewhat pear-shaped to provide a retaining or locking lobe 30 and an opposite latching shoulder 32. The retaining lobe 30 and latching shoulder 32 are disposed at opposite longitudinal sides of the stud, and blend smoothly into transversely disposed shoulders 34 and 36.

Encircling the stud beneath the shoulders 32, 34 and 36 and the lobe 30 are receiver seats 38, 40, 42 and 44 which cooperatively form a continuous surface of varying shape as shown in FIGS. 2, 3 and 5. The bottom wall or surface of these seats is formed on considerably larger radii than in the case of the stud shown in U.S. Pat. No. 4,646,399 and the stud can thereby accommodate a receiver of varying thickness as, for example, receivers mounted on between one and four or even five thicknesses of fabric. More specifically, as shown in FIGS. 3 and 6, in connection with the receiver seat 38 (herein termed the locking seat), beneath the locking lobe 30, the seat is concave and is formed on a radius of curvature t that is substantially greater than the radius of curvature r of the confronting receiver. In FIG. 6 there is shown in solid outline at R a receiver mounted on a single layer of fabric F. As the number of fabric layers on which receivers are mounted increases, the thickness of the receivers also increases as shown in exaggerated form at $R_2$, $R_3$ and $R_4$ representing receivers mounted on respectively two, three and four layers of fabric. Thus, as used herein, when indicating that the radius t of locking seat 38 (see FIG. 3) is substantially greater than the thickness of the receiver, the context refers to a radius to which is sufficiently greater than the thickness of the receiver that the stud will accommodate receivers mounted on from at least one to four fabric layers.

In a representative embodiment utilizing receivers similar to number 3 grommets, the thickness through the receiver was measured as follows:

| # of Fabric Layers | Thickness of Receiver |
| --- | --- |
| 1 | 0.180" |
| 2 | 0.184" |
| 3 | 0.188" |
| 4 | 0.215" |

The radius t of the locking seat 38 beneath the locking lobe 30 is on the order of 0.130". Thus, the radius t of the seat 38 should be greater than about 0.6 times the maximum thickness of the receiver where receivers of varying thickness but essentially constant inside diameter (hole diameter) are utilized. This relationship of seat radius to receiver thickness appears desirable for enabling receivers mounted on varying numbers of fabric layers to snap with proper action on the stud.

The prior art studs shown in U.S. Pat. Nos. 4,577,376, 4,646,399 and 4,409,706 were not designed to accommodate receivers of varying thickness.

Figure 13A:
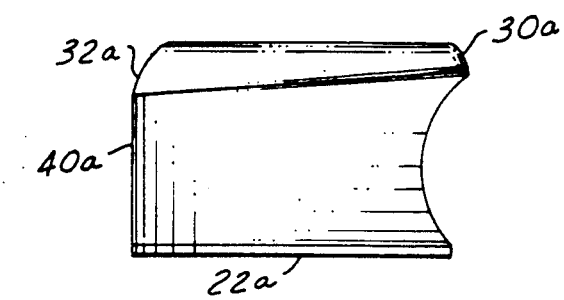
FIG. 13A is a modified form of the stud wherein the receiver seat beneath the latching shoulder is straight rather than concave.

The surface of receiver seats 42 and 44 as shown in FIG. 2 are formed on an even greater radius and constitute a generally smooth transition around the stud beneath the head to seat 40 beneath the latching shoulder. This latter seat, herein termed the latching seat, may be slightly concave being formed with a radius of curvature greater than the radius of curvature r of the locking seat as shown in FIG. 3. As shown at 40a in FIG. 13 this latching seat may be essentially "straight" from the edge of shoulder 32a toward the base 22a or in other words, substantially coaxial with the axis of the stud.

The root dimension of the groove forming the seats 38-44 is depicted by the dot-dash line 46 in FIGS. 2 and 3 and undulates vertically as shown. A section taken along this root dimension is shown in FIG. 5 at 46 as being nearly circular. In FIG. 3 the dash line 48 is taken on a plane perpendicular to the stud axis X-X and intersects the root 46 at seats 38 and 40. The profile of this plane is shown in somewhat exaggerated form in FIG. 5 at 48. It will be noted from FIG. 5 that the transverse dimension TD across the stud at line 48 is greater than the corresponding dimension at line 46. It is feasible to establish the dimension TD so that it is substantially equal to the internal diameter of a receiver mounted on the stud and thus, a receiver R disposed on the stud as shown in phanton in FIG. 3, will be internally supported transversely against collapse by the stud dimension TD as loading forces on the receiver in the longitudinal direction A-B (see FIG. 1) tend to deform the receiver.

The base end 22 of the stud is provided with means for resisting rotation of the stud about its axis X-X. Such means may take various forms, but is herein shown as comprising uniformly arranged radiating ridges 50. The ridges project below the base end surface 52 and may be either of V-shape with a sharp apex or slightly rounded as shown in FIGS. 2 and 3. In either event the ridges are intended to slightly penetrate the underlying member 24 to prevent rotation of the stud relative thereto when the stud is pulled tightly thereagainst. While eight such ridges are shown, a greater or lesser number may be utilized as desired.

The plan view of the base is best shown in FIG. 4 and is provided with opposed parallel straight sides 56 and 58, a straight back edge 60 beneath the locking shoulder 32 and a smoothly curving front edge 62. The rear corners may be beveled as at 64 and 66. Not only does this shape serve an orienting function in placing the stud in proper rotated position on the member 24 to which it is to be fastened, but such shape may also be utilized during manufacture for orienting the studs in automatic feeding and packaging machines.

Figure 16:
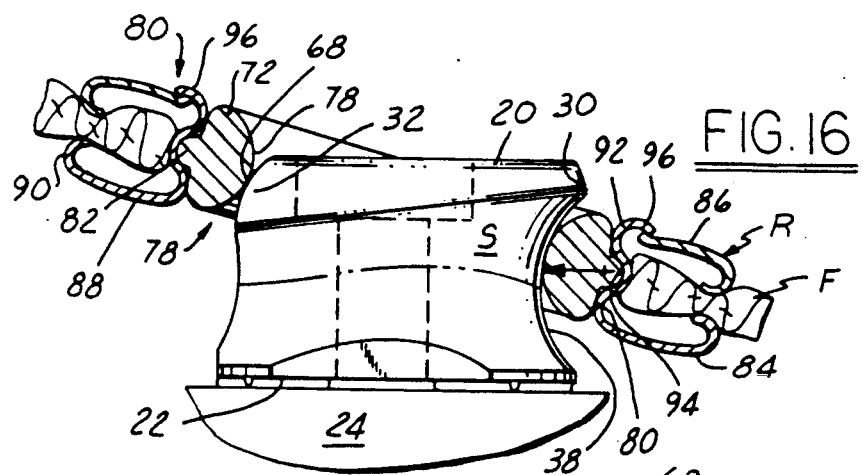
FIGS. 16 and 17 show mounting of a receiver on a stud.
Figure 17:
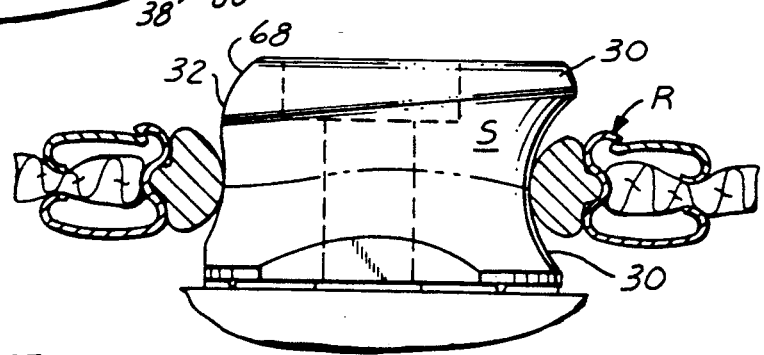

At the rear side of the head at the top of the locking shoulder 32, the head is smoothly curved as at 68 to provide a receiver camming surface operable to internally stretch the receiver R slightly within its elastic limit to permit the receiver to snap over the stud as shown in the sequence in FIGS. 16 and 17. The receiver to be used with the stud may be of the type disclosed in the aforesaid patents. A number 3 grommet is an appropriate receiver for many applications. Such a grommet when formed of nickel plated brass or stainless steel is suitable for marine applications, the latter being particularly desirable for harsh environments where relatively high stress may be encountered. However, receivers formed of other materials, including plastic, may be quite feasible.

In FIGS. 14, 16 and 17 a modified form of receiver is shown. This receiver is intended to provide a receiver structure where the portion 72 engaging the stud may be fabricated of a different material than some or all of the remaining portions of the receiver. Portion 72 is shown as an annulus of regular cross-section i.e., opposite sides present mirror images whereby either face 78 or 80 of the receiver will present the same configuration to the stud. Accordingly, the receiver will lock with its characteristic snapping action whichever face is presented to the stud. Conventional number 3 grommets, for example, while useable with the stud, often exhibit somewhat different snapping characteristics depending on which face is presented to the stud. This results because opposite faces are not mirror images and present slightly different structural configurations for engagement with the stud.

Uniformity of feel, sound and appearance may be desirable characteristics and the receiver embodiment shown in FIGS. 14, 16 and 17 is intended to provide for such. The receiver includes cooperating interlocking portions 84 and 86 intended to overlie opposite faces of a fabric member F circumjacent a hole H best shown in FIGS. 13 and 14. The hole H is prestamped or otherwise formed in the fabric member F. Such receiver portions generally correspond to conventional grommet elements and are intended to be crimped together with the fabric therebetween through the use of cooperating dies as shown in FIG. 15 where the die member 81 having a guide bore 87 cooperates with the die member 83 having a guide nose 85 intended to enter the bore 87 holding the dies in proper registry. The receiver portions 84 and 86 define an aperture within which is disposed and locked the annulus member 72. The annulus member cooperates directly with the stud. The shape and inside diameter of the annulus member 72 is essentially independent of the portions 84 and 86 of the receiver and in particular essentially independent of the crimping action of the receiver portions 84 and 86 as they are crimped between the dies. Thus this structure insures uniformity of operation independently of the crimping of the receiver members 84 and 86.

Annulus portion 72 has a smoothly curved inside diameter surface 79 (see FIG. 14) and a generally cylindrical outside diameter surface 73 exhibiting a medially disposed circumferential rib 82 for locking the annulus within the receiver portion 84. Receiver portion 86 cooperates with receiver portion 84 to embrace the marginal edge of the hole H in the fabric member F and the two portions are crimped together and against the fabric F as above mentioned and as shown in FIG. 15. Receiver portion 84 has an outer wall 88 whose outer marginal edge 90 is curved over and crimped against or into the fabric F while its inner marginal edge is defined by a wall 92 disposed generally perpendicular to the outer wall 88 and provided medially with a circumferential groove 94 for receiving the rib 82. During crimping of the receiver portions 84 and 86 between dies 81 and 83 the inner marginal edge 92 is crimped over at the curl 96 to overlie receiver portion 86. During such crimping the inner marginal edge wall 92 is urged radially inwardly to tightly grip the outside face 73 and the rib 82 of the annulus 72 thus securely locking the annulus in the receiver.

The annulus may be formed of a solid material either of metal or plastic, the material selected being chosen for the particular characteristics desired, such as strength, resistence to environmental conditions, wear resistance and the like. The annulus may be formed to provide great strength and/or rigidity for applications where either or both considerations are essential. Alternatively, the annulus may be fabricated of sheet metal, such as stainless steel while the remainder of the receiver is formed of brass or the like. This may be desirable to provide a receiver of great strength having the durability of stainless steel without the expense of forming the entire receiver therefrom. Other advantages of having a separate inner annulus will occur to those studying this design.

As shown in FIG. 15 the annulus 72 is intended to be captive in the receiver portion 84 before the portions 84 and 86 are crimped together. Thus, the canvas man using this type of receiver will only deal with two pieces as is presently conventional in assembling grommets in canvas or similar fabric products.

In selecting the material for the inner annulus 72 and determining its dimensional relationships to the stud, due consideration must be given to the necessity of having the annulus snap over and be locked on the stud as shown in FIGS. 16 and 17. Thus, the inside diameter of the annulus must be slightly undersized the shortest dimension of the stud measured from the receiver seat 38 beneath the retaining lobe to the apex of the locking shoulder 32, the dimensional relationship being such that as the receiver is cammed down over the camming surface 68 the annulus will flex sufficiently within its elastic limit to snap over the locking shoulder to be seated as shown in FIG. 17.

Figure 9:
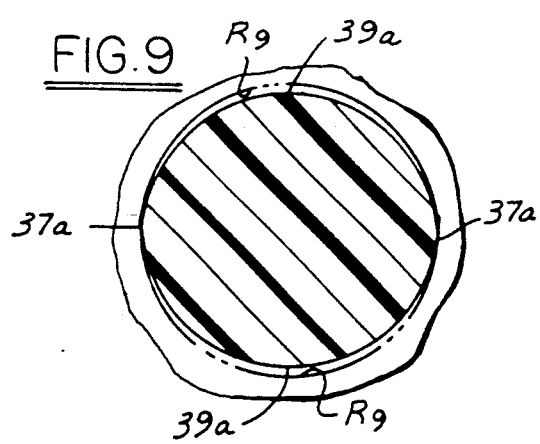
Figure 10:
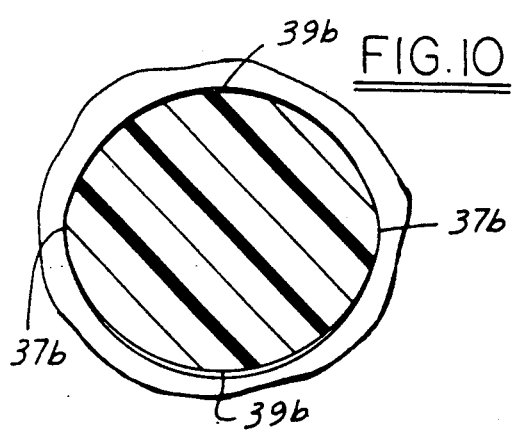
Figure 11:
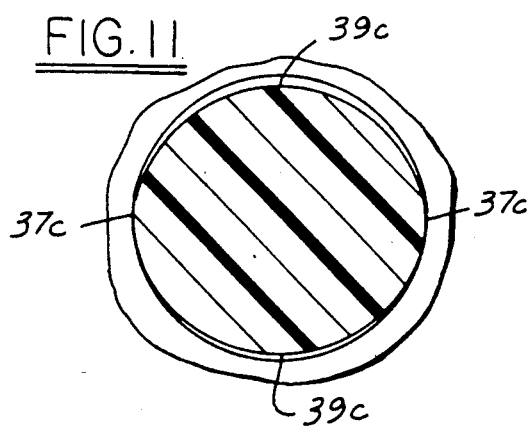
Figure 12:
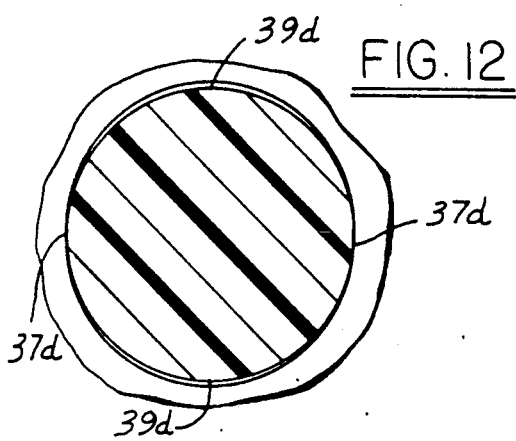

In FIGS. 7–12 there are shown several critical relationships between the stud and a receiver. Planes 8, 9, 10, 11 and 12 extend through the center of curvature C of locking seat 38. Plane 8 is shown in profile in FIG. 8. The receiver R is shown as having a circular opening $R_8$ while the profile of the stud S is slightly elongated thereby causing the receiver to rest against the stud at opposite points 37 (on camming surface 68 and locking seat 36) but spaced from the stud slightly at opposite points 39 at sides 34 and 36 (see FIG. 2). As the receiver is pressed down the sloping camming surface 68 from plane 8 to plane 9, the receiver is stretched between points 37a as shown in FIG. 9 and simultaneously slightly narrowed at points $R_9$. The stud is also relieved at 39a at opposite sides to continue to afford space between the now slightly narrowed receiver and the stud head. As the receiver continues to be pushed down the camming surface 68 it reaches plane 10, illustrating in FIG. 10 the greatest elongation of the receiver; the receiver being stretched within its elastic limits between points 37b and by virtue of the relief of the sides of the stud head as shown in FIGS. 2 and 10 at 39b such elongation of the receiver is permitted. The receiver at plane 10 is virtually ready to snap on down the stud through the position of plane 11 where the receiver is beginning to recover from its elongation as shown in FIG. 11 but still bears at points 37c against the stud and is still slightly spaced at 39c from the stud. At plane 12 the receiver has assumed its original substantially circular condition as shown in FIG. 12. The receiver may lightly bear, or even be slightly spaced, from the stud at points 37d. At the sides 39d, the receiver should be only slightly spaced, if at all, or in light contact with the stud whereby the stud will offer internal transverse support for the receiver under the influence of loading in the direction A-B (see FIG. 1) thereby supporting the receiver against collapse during such loading and preventing distortion beyond its elastic limit.

A critical dimension of the stud is the locking dimension LD shown in FIG. 3. This dimension lies in plane 10 shown in FIGS. 7 and 10. It may be defined as the greatest thickness or dimension across the stud between the locking seat 38 and the latching shoulder 32 lying in a plane intersecting the center of curvature C of the locking seat. The locking dimension in the preferred embodiment should be sufficiently greater than the undistorted internal diameter of the receiver so that the receiver will be stretched to audibly snap on to the latching seat as the receiver is cammed down over the latching shoulder. At the same time the locking dimension LD should not exceed the internal diameter of the receiver by such an amount that when the receiver is stretched over the locking dimension the receiver is deformed beyond its elastic limit. Thus, the deformation of the receiver in moving from plane 8 through plane 12 and back again should be within the elastic limit of the receiver. As shown in FIG. 3, the least dimension E measured from the apex of the retaining lobe 30 to the latching seat should be sufficiently greater than the internal diameter of the receiver that the receiver cannot be tilted or lifted off the stud by lifting the edge of the receiver beneath the retaining lobe.

Figure 18:
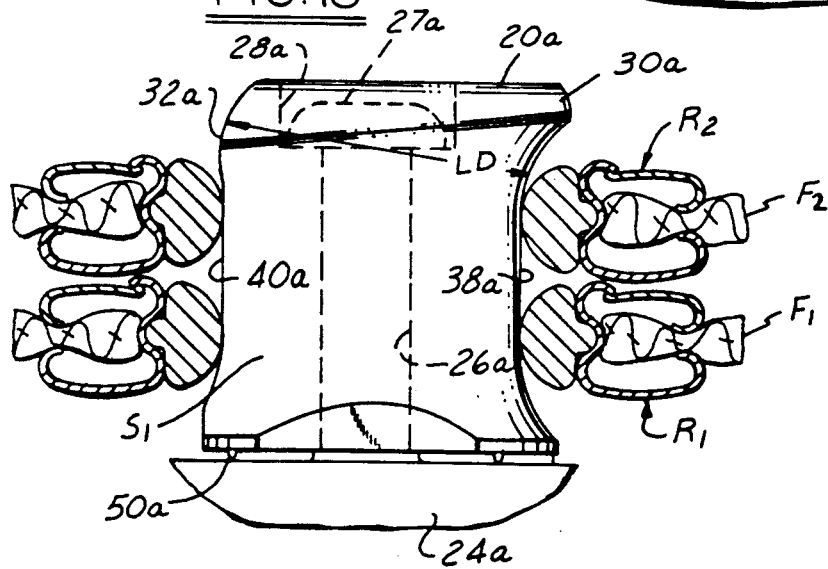
FIG. 18 shows a stud for accepting multiple receivers.

In FIG. 18 there is shown a modified form $S_1$ of the stud intended to receive thereon at least two receivers $R_1$ and $R_2$ mounted on fabric $F_1$ and $F_2$. In this embodiment the stud is generally similar to that previous described except the receiver seats $38_a$ and $40_a$ are of greater vertical dimension to accommodate the receivers. The head $20a$ is, as before, generally pear-shaped in cross-section similar to that shown in FIG. 1 and has a locking lobe $30a$ and an oppositely disposed latching shoulder $32a$. The stud has a vertical bore $26_a$, a counter bore $28_a$ and is intended to be secured to a member $24_a$ by a suitable fastener such as a rivet, bolt, screw or the like, represented generically at $27_a$. The locking dimension LD shown in FIG. 18 is as before described in connection with FIGS. 3 and 7. The base of the stud may be provided with radially extending ribs $50_a$ as before described to prevent rotation of the stud. This form of stud is particularly suitable when, for example, it is desired to attach in overlapping relation the edges of two oppositely extending sections of a boat cover or the like on a common stud.

Figure 19:
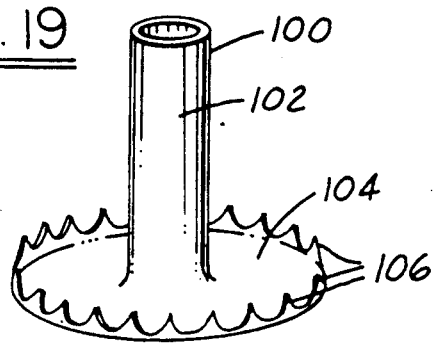
FIG. 19 is a tubular rivet element particularly useful in securing a stud to fabric material.
Figure 20:
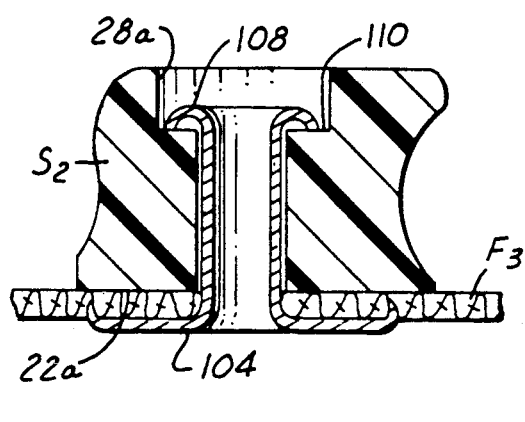
FIG. 20 shows the mounting arrangement for a stud on the fabric material.
Figure 21:
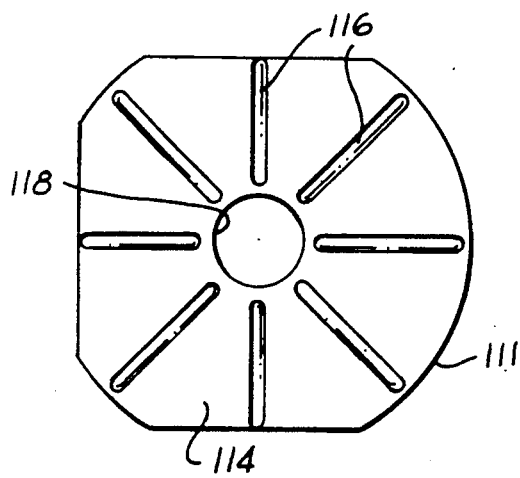
FIG. 21 is a top or plan view of a stud adapter for use with cylindrical surfaces to facilitate mounting of the stud of FIG. 1 thereon.
Figure 22:
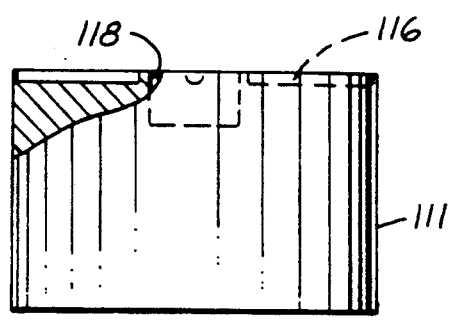
FIG. 22 is a front elevation of the stud adapter of FIG. 21.
Figure 23:
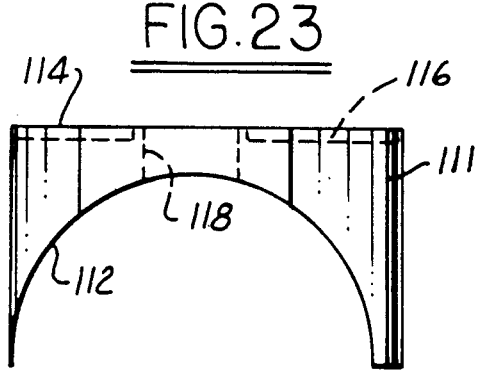
FIG. 23 is a side elevation of the stud adapter of FIGS. 21 and 22.
Figure 24:
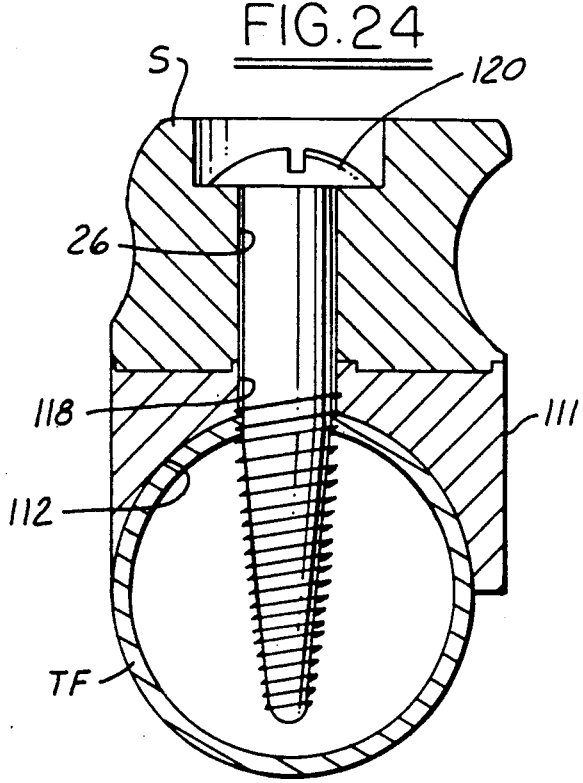
FIG. 24 is a cross-sectional view through the assembly of a stud adapter and a stud, mounted on a cylindrical support.

In FIGS. 19 and 20 there is shown a tubular rivet 100 intended to cooperate with a stud of the type disclosed in this application or in the aforesaid related patents. This rivet is intended to prevent rotation of the studs in the fabric on which they are mounted, and may be used with studs having or not having the radial ribs 50 and $50_a$. The rivet has a tubular shank 102 terminating at one end in a circular head 104 having axially extending peripheral teeth 106 for engaging in a fabric member $F_3$ as shown in FIG. 20 beneath the base $22_a$ of the stud $S_2$. The stud $S_2$ is shown without the ribs 50, but such may be provided if desired. The opposite end of the rivet from the head 104 is crimped over as at 108 to overlie and bear against the bottom 110 of the counter bore $28_a$ and lock the stud securely against the fabric $F_3$ squeezing the same between the head 104 and the base of the stud. The frictional engagement of the crimped end 108 against the bottom 110 of the counter bore is intended to prevent rotation of the stud on the fabric layer. Should there still be a tendency in a particular application for the stud to rotate, studs having the ribs 50 should be used. The teeth 106 are sufficiently spaced circumaxially so that ribs 50 will fit therebetween such that the fabric will be gripped between the ribs and teeth to provide a particularly secure non-rotative attachment between the stud and underlying fabric.

In FIGS. 21-24 there is shown an arrangement for mounting the stud on a cylindrical surface such as a tubular frame TF. It is important in such a mounting that the proper rotative orientation be maintained and thus the stud must not be permitted to rotate. As disclosed, a stud mounting adapter 111 of saddle-shaped configuration has a semi-cylindrical opening 112 sized to mate with the tubular frame as shown in FIG. 17 and a flat stud mounting surface 114 provided with radially extending grooves 116 matching in configuration and arrangement the ribs 50 on the stud base. The adapter has a through aperture 118 intended to align with the mounting hole 26 when the stud of FIGS. 1-5 is mounted on the adapter. A fastener such as a sheet metal screw 120 or a bolt, rivet or the like, is extended through the stud, adapter, and into the tubular frame to tighten therein and lock the parts together. The ribs 50 on the base of the stud cooperate with the grooves in the adapter to prevent rotation of the stud. Thus the stud may be mounted on the tubular framework utilizing the adapter shown and will not rotate thereon.

We claim:

1. A snap fastener assembly comprising, in combination;

a generally cylindrical stud having a head at one end and intended to be mounted in upstanding relation at its opposite end on a member to be fastened;

receiver seats disposed on opposite sides of the stud beneath said head;

a latching shoulder on the head above one of the seats;

a retaining lobe on the head above the opposite seats;

said stud through the latching shoulder and retaining lobe being generally pear-shaped;

the dimension of the stud measured from the apex of said lobe to the seat on the opposite side of the stud being grater than the dimension of the stud measured from the apex of said shoulder to the seat on the other side of the stud to lock a receiver in said seats beneath the head;

a receiver to be secured to a part to be fastened and having a circular aperture for reception over the stud with the surface of the receiver at the aperture confronting the stud; and said receiver seat beneath said lobe being generally concave and having a radius of curvature substantially greater than the radius of curvature of the confronting surface of the receiver whereby the stud will accommodate receivers of varying thickness.

2. The invention defined by claim 1 wherein the radius of curvature of the receiver seat beneath the retaining lobe is greater than about 0.6 times the maximum thickness of receivers to be accommodated.

3. The invention defined by claim 1 wherein said receiver seats have a dimension measured axially of the stud sufficient to accommodate a plurality of axially aligned and stacked receivers.

4. The invention defined by claim 3 wherein the radius of curvature of the receiver seat beneath the retaining lobe is immediately subjacent the lobe and the said seat is substantially straight for a distance beneath such curvature.

5. The invention defined by claim 1, 2 or 3 wherein the receiver seat beneath said latching shoulder is generally concave and has a radius of curvature greater than the radius of curvature of the opposite seat.

6. The invention defined by claim 1, 2 or 3 wherein the receiver seat beneath said latching shoulder extends substantially coaxially of the stud.

7. A snap fastener assembly comprising, in combination;

a generally cylindrical stud having a head at one end and intended to be mounted in upstanding relation at its opposite end on a member to be fastened;

receiver seats disposed on opposite sides of the stud beneath said head;

a latching shoulder on the head above one of the seats;

a retaining lobe on the head above the opposite seat;

said stud, including the latching shoulder and retaining lobe having a continuous peripheral surface and being generally pear-shaped;

the dimension of the stud measured from the apex of said lobe to the seat on the opposite side of the stud being greater than the dimension of the stud measured from the apex of said shoulder to the seat on the other side of the stud to lock a receiver in said seats beneath the head;

a receiver to be secured to a part to be fastened and having a circular aperture for reception over the stud; and the transverse dimension of the stud lying in a plane perpendicular to the stud axis and intersecting the bottom of the receiver seats beneath the shoulder and lobe being substantially equal to the internal diameter of the receiver when seated on the stud in said seats to support the receiver against collapse by loading forces thereon extending in the direction of said longitudinal dimension.

8. A stud assembly for a snap fastener for mounting on a cylindrical surface comprising, in combination:

a generally cylindrical member having a head at one end and a base at the opposite end intended to be mounted in upstanding relation at its base on a member to be fastened;

receiver seats disposed on opposite sides of the stud beneath said head;

a latching shoulder on the head above one of the seats;

a retaining lobe on the head above the opposite seats;

said stud, including the latching shoulder and retaining lobe, being generally pear-shaped;

a saddle-shaped adapter for embracing the cylindrical surface of the member on which the stud is to be mounted;

said saddle-shaped member and said stud having aligned through apertures whereby fastener means may be extended through the stud and adapter to cooperatively engage the cylindrical member for retaining the stud and adapter thereon; and means for preventing relative rotation between the stud and adapter.

9. The invention defined by claim 8 in which said base and adapter have mating faces provided with cooperating projections and recesses for limiting relative rotation of the stud on the adapter.

10. A receiver for a snap fastener comprising, in combination:

a receiver portion for overlying a fabric member and to be secured thereto;

said receiver portion defining an aperture;

said receiver portion having an annular groove at the aperture and extending circumferentially therearound and located substantially wholly within the aperture; and a continuous annulus member disposed in said aperture and radially interlocked with the receiver portion substantially coplanar with the fabric to provide a stud engaging surface for the receiver.

11. The invention defined by claim 10 characterized in that said annulus member is provided with a peripheral rib for fitting in said groove and trapping the annulus member within said aperture.

12. The invention defined by claim 10 wherein said annulus member is formed of a material different than the material of said receiver portion.

13. The invention defined by claim 10 wherein said receiver portion is formed of sheet material and said annulus is a solid relatively less distortable member.

14. The invention defined by claim 10 wherein said receiver portion is formed of materials taken from the class comprising brass, stainless steel and plastic and the annulus member is found of materials taken from the class comprising plastic and stainless steel.

* * * * *